US009623367B2

(12) United States Patent
Boccaletti et al.

(10) Patent No.: US 9,623,367 B2
(45) Date of Patent: Apr. 18, 2017

(54) METHOD FOR REMOVING CARBON DIOXIDE FROM GAS MIXTURES

(71) Applicant: SOLVAY SPECIALTY POLYMERS ITALY S.P.A., Bollate, MI (US)

(72) Inventors: Giovanni Boccaletti, Roncoferraro (IT); Roberta Colombo, Varedo (IT); Valerio Carsetti, Arese (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 0 days.

(21) Appl. No.: 15/106,058

(22) PCT Filed: Dec. 16, 2014

(86) PCT No.: PCT/EP2014/077957
§ 371 (c)(1),
(2) Date: Jun. 17, 2016

(87) PCT Pub. No.: WO2015/091477
PCT Pub. Date: Jun. 25, 2015

(65) Prior Publication Data
US 2016/0310889 A1 Oct. 27, 2016

(30) Foreign Application Priority Data

Dec. 20, 2013 (EP) .................................. 13199031

(51) Int. Cl.
*B01D 53/14* (2006.01)
(52) U.S. Cl.
CPC ..... *B01D 53/1493* (2013.01); *B01D 53/1468* (2013.01); *B01D 53/1475* (2013.01); *B01D 2252/2025* (2013.01); *B01D 2258/0283* (2013.01); *Y02C 10/06* (2013.01); *Y02E 20/16* (2013.01); *Y02E 20/18* (2013.01)
(58) Field of Classification Search
CPC ............ B01D 53/1493; B01D 53/1456; B01D 53/1475; B01D 53/14; B01D 53/00; B01D 53/1468; B01D 2252/2025
See application file for complete search history.

(56) References Cited

U.S. PATENT DOCUMENTS

| 3,214,478 A | 10/1965 | Milian, Jr. |
| 3,242,218 A | 3/1966 | Miller et al. |
| 3,665,041 A | 5/1972 | Sianesi et al. |
| 3,715,378 A | 2/1973 | Dario et al. |
| 2010/0158793 A1 | 6/2010 | Bouillon |

FOREIGN PATENT DOCUMENTS

| CA | 786877 A | 6/1968 | |
| DE | 102004053167 A1 * | 5/2006 | ......... B01D 53/1425 |
| EP | 148482 A2 | 7/1985 | |
| EP | 2189416 A1 | 5/2010 | |
| EP | 2201994 A2 * | 6/2010 | ......... B01D 53/1475 |
| FR | 2923728 A1 * | 5/2009 | ......... B01D 53/1456 |
| FR | EP 2189416 A1 * | 5/2010 | ......... B01D 53/1475 |
| GB | 1226566 A | 3/1971 | |

OTHER PUBLICATIONS

Casimiro T. et al., "Phase behavior studies of a perfluoropolyether in high-pressure carbon dioxide", Fluid Phase Equilibria, 2004, No. 224, p. 257-261—Elsevier B.V.
Miller M.B. et al., "CO2-philic Oligomers as Novel Solvents for CO2 Absorption", Energy & Fuels, Oct. 25, 2010, vol. 24, pp. 6214-6219—American Chemical Society.
Miller M.B. et al., "Solubility of CO2 in CO2-philic oligomers; COSMOtherm predictions and experimental results", Fluid Phase Equilibria, Sep. 1, 2009, vol. 287, No. 1, pp. 26-36—Elsevier B.V.
Matsumoto D.K. et al., "Solubility of hydrogen and carbon monoxide in selected nonaqueous liquids", Ind. Eng. Chem. Process Des. Dev., 1985, vol. 24, p. 1297-1300—American Chemical Society.

\* cited by examiner

*Primary Examiner* — Duane Smith
*Assistant Examiner* — Cabrena Holecek

(57) ABSTRACT

A method for removing carbon dioxide ($CO_2$) from gas streams given off in power plants is herein disclosed. The method comprises the use of certain linear perfluoropolyethers and represents a valuable alternative to other methods comprising the use of chemical agents.

13 Claims, No Drawings

METHOD FOR REMOVING CARBON DIOXIDE FROM GAS MIXTURES

CROSS-REFERENCE TO RELATED APPLICATIONS

This application is a U.S. national stage entry under 35 U.S.C §371 of International Application No. PCT/EP2014/077957 filed Dec. 16, 2014, which claims priority to European patent application No. 13199031.9, filed on Dec. 20, 2013. The entire contents of these applications are explicitly incorporated herein by this reference.

TECHNICAL FIELD

The present invention relates to a method (or process) for removing carbon dioxide ($CO_2$) from gas mixtures.

BACKGROUND ART

Integrated gasification combined cycle (IGCC) plants are power plants wherein coal and other carbon-based fuels are submitted to a combustion process and turned into gases. Carbon dioxide ($CO_2$) emissions produced as a result of the combustion process has recently become a major environmental concern; thus, different methods have been developed in order to remove $CO_2$ from gas streams produced in IGCC plants.

It is known, for example, to remove $CO_2$ from gas streams by chemical absorption with amines (typically monoethanolamine), if the gas stream is at low pressure, or by physical absorption if the mixture is at high pressure.

CASIMIRO, T., et al. Phase behavior studies of a perfluoropolyether in high-pressure carbon dioxide. *Fluid Phase Equilibria*. 2004, no. 224, p. 257-261. reports on vapor-liquid equilibrium measurements for the binary system $CO_2$-Krytox® 157 FSL (per)fluoropolyether (PFPE), a carboxy-terminated branched PFPE comprising units of formula —$CF(CF_3)CF_2O$—. No data or information is reported in this article concerning the solubility of other gases in the PFPE and no mention or suggestion is given on the possible use of other PFPEs for the dissolution/extraction of $CO_2$.

MILLER, Mathew B., et al. CO2-philic Oligormer as Novel Solvents for CO2 Absorption. *Energy&Fuels*. 2010, vol. 24, p. 6214-6219. teaches the use of certain oligomers as solvents for $CO_2$ absorption in an integrated gasification combined cycle plant. This document teaches that the desirable properties of such solvents are selectivity of $CO_2$ over $H_2$ and water, low viscosity, low vapor pressure, low cost and minimal environmental, health and safety impact. According to this document, polypropylene glycol dimethylether (PPGDME) and polydimethyl siloxane (PDMS) revealed the most promising solvents. A branched PFPE or PFPE glycol of formula $CF_3CF_2[OCF_2CF(CF_3)]_nF$ was also tested; however, on page 6216, right-hand column, lines 17-20, it is stated that the tested PFPE gave poor performance in a test wherein the solubility of $CO_2$ was measured. This prior art does not report data on the absorption selectivity $CO_2$ over $N_2$.

MILLER, Matthew B., et al. Solubility of CO2 in CO2-philic oligomers; COSMOtherm predictions and experimental results. *Fluid phase equilibria*. 2009, vol. 287, no. 1, p. 26-36. reports on a study aimed at investigating the performances of certain $CO_2$-philic solvents, including Krytox® GPL 100 PFPE, in physical $CO_2$ absorption. In the paragraph "Conclusions", it is stated that "The pressure required to dissolve $CO_2$ in PFPE was notably greater than that required for PDMS, PEGDME and PPGDME". This document does not investigate on the selectivity of the selected solvents towards gases other than $CO_2$.

It is known that the Bunsen coefficient at 20° C. of branched Fomblin® Y25 PFPE for pure $N_2$ (i.e. not in admixture with other gases) is 0.190 and for pure $CO_2$ is 1.30. The Bunsen coefficient at 20° C. of straight Fomblin® Z25 is 0.23 for pure $N_2$ and 1.50 for pure $CO_2$. The Bunsen coefficient is defined as the volume of gas, reduced to 0° C. and to 760 Torr, which is absorbed by the unit volume of solvent (at the temperature of measurement) under a gas pressure of 760 Torr. From the above values it is calculated that, under equilibrium conditions, branched Fomblin® Y25 PFPE has an absorption selectivity $CO_2/N_2$ of 6.9 and that linear Fomblin® Z25 has an absorption selectivity $CO_2/N_2$ of 6.5. Therefore, these values would lead to expect that branched Fomblin® PFPEs have higher selectivity than linear Fomblin® PFPEs towards $CO_2$ in mixtures of $CO_2$ and $N_2$.

MATSUMOTO, David K., et al. Solubility of Hydrogen and Carbon Monoxide in Selected Nonaqueous Liquids. *Ind Eng. Chem. Process Dev.* 1985, vol. 24, p. 1297-1300. gives a report of a study aimed at determining the solubility of carbon monoxide in selected non-aqueous liquids, including branched Fomblin® YR PFPE. This fluorinated fluid revealed more effective than the other tested fluids in dissolving gases. On page 1297, left-hand column, this document teaches that gases have greater solubility in highly fluorinated fluids. However, this document does not specifically mention carbon dioxide or other PFPE fluids.

DE 102004053167 A (DEGUSSA [DE]) 4 May 2006 relates to a means for adsorbing gases from gas mixtures, characterized in that it contains a polymer with a branching degree of at least 35% and a molar mass from 500 g/mol to 100,000 g/mol and, optionally, a solvent. The gas can be $CO_2$ and the polymer can be a PFPE.

FR 2923728 A (INST FRANCAIS DU PETROLE [FR]) 22 May 2009 discloses a process for liquefying a gas effluent rich in $H_2S$ or $CO_2$ which comprises contacting a gas mixture with a mixture of at least two liquid phases not miscible with one another, at least one of which being an aqueous phase. The phase that is not miscible with water can be a perhalogenated solvent, including a PFPE.

EP 2189416 A (INST FRANCAIS DU PETROLE [FR]) 26 May 2010 discloses a process for the manufacture of hydrogen, said process comprising a step wherein a hydrogen flux containing methane and $CO_2$ are formed and a step of recovery of the methane and $CO_2$ as hydrates by means of a mixture of water and a water-immiscible solvent, including halogenated solvents like hydrofluoroethers (HFEs) and PFPEs.

EP 2201994 A (GEN ELECTRIC [US]) 30 Jun. 2010 relates to an absorbent for $CO_2$ which comprises "a liquid, non aqueous oligomeric material, functionalized with one or more groups that reversibly react with $CO_2$ and/or have a high affinity for $CO_2$". The functionalized material can be a functionalized PFPE.

There is therefore the need for an alternative method for effectively and selectively removing $CO_2$ from gas streams, said method reducing concerns for environment, health and safety.

SUMMARY OF INVENTION

It has now surprisingly been found that linear (per) fluoropolyethers (PFPE) fluids are able to remove carbon dioxide from gas mixtures with higher efficiency and selectivity than branched PFPE fluids.

Accordingly, the present invention relates to a method for removing carbon dioxide ($CO_2$) from a gas mixture, said method comprising contacting a gas mixture containing $CO_2$ and at least one other gas, with at least one of:

1) one or more (per)fluoropolyether PFPE fluid complying with formula (I) below:

wherein:
T and T', equal to or different from each other, are selected from $CF_3$, $C_2F_5$ and $C_3F_7$;
a1, a2, a3 and a4, equal to or different from each other, are independently integers $\geq 0$, selected in such a way that a1+a2+a3+a4 ranges from 20 to 220 and a2/a1 ranges from 0.1 to 10, preferably from 0.5 to 2; should at least two of a1-a4 be different from 0, the different recurring units are statistically distributed along the chain;

2) one or more PFPE fluid complying with formula (II) below:

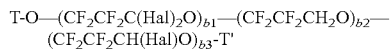

wherein
T and T', equal to or different from each other, are selected from $-CF_3$, $-C_2F_5$ or $-C_3F_7$;
Hal, equal or different at each occurrence, is a halogen selected from F and Cl, preferably F;
b1, b2, and b3 equal or different from each other, are independently integers $\geq 0$, such that b1+b2+b3 is in the range 5 to 250; should at least two of b1, b2 and b3 be different from zero, the different recurring units are generally statistically distributed along the chain.

PFPE fluids of formula (I) can be manufactured by photooxidation of $C_2F_4$ as reported in U.S. Pat. No. 3,715,378 (MONTEDISON S.P.A.) 6 Feb. 1973 and subsequent treatment with fluorine as described in U.S. Pat. No. 3,665,041 (MONTEDISON S.P.A.) 23 May 1972.

Typically, in formula (I) above, a1-a4 are selected in such a way that a3+a4 ranges from 3 to 4% wt with respect to the overall weight of the a1-a4 units.

Suitable PFPE fluids of formula (I) as defined above are those having a molecular weight ranging from 2,000 to 12,500 and a kinematic viscosity measured according to ASTM D445 at 20° C. ranging from 10 to 1,300 cSt; said fluids are marketed by Solvay Specialty Polymers under the tradename Fomblin® M, like Fomblin® M03, Fomblin® M15, Fomblin® M30, Fomblin® 60 and Fomblin® M100 PFPEs.

According to a preferred embodiment, the PFPE fluid of formula (I) has a molecular weight of 4,000 and a kinematic viscosity measured according to ASTM D445 at 20° C. of 30 cSt; this fluid is marketed with tradename Fomblin® M03 PFPE.

PFPE fluids of formula (II) can be prepared by ring-opening polymerizing 2,2,3,3-tetrafluorooxethane in the presence of a polymerization initiator to give a polyether comprising repeating units of the formula: $-CH_2CF_2CF_2O-$, and optionally fluorinating and/or chlorinating said polyether, as disclosed in EP 148482 A (DAIKIN INDUSTRIES) 17 Oct. 1985.

The one or more linear PFPE fluid of formula (I) and/or (II) can also be used in admixture with one or more branched PFPE fluid comprising repeating units of formula $CF(CF_3)$ $CF_2O$, said branched PFPE fluid being preferably selected from any one of formulae (III)-(VI) below:

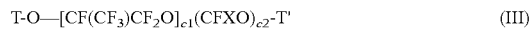

wherein:
X is equal to $-F$ or $-CF_3$;
T and T', equal to or different from each other, are selected from $-CF_3$, $-C_2F_5$ or $-C_3F_7$;
c1 and c2, equal or different from each other, are independently integers $\geq 0$ selected such that the c1/c2 ratio is comprised between 20 and 1,000 and c1+c2 is in the range 5 to 250; should c1 and c2 be both different from zero, the different recurring units are generally statistically distributed along the chain.

PFPE fluids of formula (III) can be obtained by photooxidation of the hexafluoropropylene as described in CA 786877 (MONTEDISON SPA) 31 Mar. 1971, and by subsequent conversion of the end groups as described in GB 1226566 (MONTECATINI EDISON SPA) 31 Mar. 1971;

wherein
T" is equal to $-C_2F_5$ or $-C_3F_7$;
d is an integer from 5 to 250.

PFPE fluids of formula (IV) can be prepared by ionic hexafluoropropylene epoxide oligomerization and subsequent treatment with fluorine as described in U.S. Pat. No. 3,242,218 (DU PONT) 22 Mar. 1966.

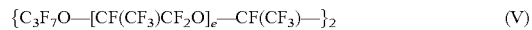

wherein
e is an integer between 2 and 250.

PFPE fluids of formula (V) can be obtained by ionic telomerization of the hexafluoropropylene epoxide and subsequent photochemical dimerization as reported in U.S. Pat. No. 3,214,478 (DU PONT) 26 Oct. 1965.

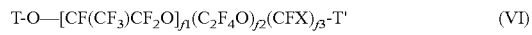

wherein
X is equal to $-F$ or $-CF_3$;
T and T', equal to or different from each other, are selected from $-CF_3$, $-C_2F_5$ or $-C_3F_7$;
f1, f2 and f3 equal or different from each other, are independently integers $\geq 0$, such that and f1+f2+f3 is in the range 5 to 250; should at least two of f1, f2 and f3 be different from zero, the different recurring units are generally statistically distributed along the chain.

PFPE fluids of formula (VI) can be manufactured by photooxidation of a mixture of $C_3F_6$ and $C_2F_4$ and subsequent treatment with fluorine as described in U.S. Pat. No. 3,665,041 (MONTEDISON SPA) 23 May 1972.

If one or more branched PFPE fluid of formulae (III)-(VI) is used, the weight amount of said fluid ranges from 1 to 50% by weight with respect to the one or more linear PFPE fluid of formula (I) and/or (II).

For the purposes of the present invention, branched PFPE fluids of formula (III) above, available from Solvay Specialty Polymers under the tradename Fomblin® Y, are preferred. Preferably Fomblin® Y PFPEs are used in admixture with a linear PFPE of formula (I); mixtures of linear PFPEs of formula (I) and branched PFPEs of formula (III) are available from Solvay Specialty Polymers Italy with tradename Fomblin® W PFPEs.

In the method according the invention, the gas mixture comprising $CO_2$ is contacted with one or more PFPE of formula (I) and/or (II) as defined above for a time sufficient to remove $CO_2$ from the mixture. Typically, the gas mixture is a gas stream given off in a combustion process of fossils in an integrated gasification combined cycle (IGCC) power plant. Usually, the gas stream is passed in a gas tank and contacted with a counter-current stream of one or more PFPE fluid of formula (I) and/or (II), said PFPE being at a pressure and rate sufficient for removing $CO_2$ from the gas stream.

Typically, the at least one other gas contained in the gas mixture is selected from hydrogen, nitrogen, oxygen, carbon monoxide, nitrogen oxides, sulphur oxides, methane and low molecular weight hydrocarbons.

It has also been observed that the method according to the present invention can be conveniently carried out when the one or more PFPE of formula (I) and/or (II) is mixed with one or more additives, said additives being suitable for preventing or reducing deterioration of the gas tank, like, e.g., anti-rust additives and anti-foaming additives. Typically, additives are present in amount ranging from 1 to 10% wt by weight with respect to the one or more linear PFPE fluid of formula (I) and/or (II) optionally in admixture with the one or more branched PFPE fluid of formulae (III)-(VI).

Should the disclosure of any patents, patent applications, and publications which are incorporated herein by reference conflict with the description of the present application to the extent that it may render a term unclear, the present description shall take precedence.

The invention and its advantages are illustrated in greater detail in the following experimental section.

EXPERIMENTAL SECTION

1. Materials and Methods

Fomblin® M03, Fomblin® Y04 and Fomblin® DA 306 were obtained from Solvay Specialty Polymers.

2. Test 1

Test 1 was carried out in a reactor having a total volume of 5.37 liters, equipped with pressure and temperature system control devices and with a mixing system (speed: 450 rpm). The temperature was set at 25° C. A gas mixture of $CO_2$ (40% by pressure) and $N_2$ (60% by pressure) was filled in the empty reactor until a pressure of 3 bars was reached. 1 liter of Fomblin® PFPE oil was added to the reactor, thereby increasing the gas pressure due to the reduction of the free volume. The theoretical pressure of the gases was calculated considering the gases as ideal gases at the temperature and pressure of the test. The mixing fluid system was then switched on and the Initial Pressure value was measured. Pressure variation was observed at different times. After a certain time, the system was considered to have reached equilibrium conditions and the Final Pressure value was measured. Then the mixing system was switched off and 0.5 liter of Fomblin® PFPE oil was added to reactor, reaching a total volume of 1.5 liters of fluid and the procedure was repeated. Further 0.5 liter aliquots of Fomblin® PFPE oil were added until a total volume of 4.5 liters PFPE oil was reached.

The results are reported in Tables 1 and 2 below. The ΔP theor-initial (%) value is a measure of the instantaneous absorption of the gas in the fluids. The ΔP theor-final (%) value is a measure of the pressure reduction after a fixed time and predicts the absorption capacity of the fluids under industrial-scale conditions.

TABLE 1

Absorption of CO2 and N2 by Fomblin(R) M PFPE at 25° C.

| Total volume of Fomblin ® M PFPE | Theor P (bars) | Initial P (bars) | Final P (bars) (after 6 min) | ΔP theor-initial (%) | ΔP theor-final (%) |
|---|---|---|---|---|---|
| 1 | 3.69 | 3.38 | 3.36 | 8 | 9 |
| 1.5 | 4.16 | 3.74 | 3.22 | 10 | 23 |
| 2.5 | 5.61 | 3.78 | 3.70 | 33 | 34 |
| 3.5 | 8.61 | 4.67 | 4.41 | 46 | 49 |
| 4.5 | 18.52 | 7.50 | 6.10 | 59 | 67 |

TABLE 2

Absorption of CO2 and N2 by Fomblin(R) Y PFPE at 25° C.

| Total volume of Fomblin ® Y PFPE | Theor P (bars) | Initial P (bars) | Final P (bars) (after 6 min) | ΔP theor-initial (%) | ΔP theor-final (%) |
|---|---|---|---|---|---|
| 1 | 3.69 | 3.60 | 3.51 | 2 | 5 |
| 1.5 | 4.16 | 3.93 | 3.43 | 6 | 18 |
| 2.5 | 5.61 | 4.01 | 3.90 | 29 | 31 |
| 3.5 | 8.61 | 5.08 | 4.69 | 41 | 46 |
| 4.5 | 18.52 | 9.08 | 7.51 | 51 | 59 |

Tables 3 and 4 report the results obtained by measuring at Final P (GPC) the gas mixture composition (amount of $N_2$ and $CO_2$) on top of the reactor after addition of different amounts of PFPE fluid. The variation of $CO_2$ is an indicator of the absorption selectivity (the higher the variation, the higher the fluid's ability to selectively absorb $CO_2$ over $N_2$).

TABLE 3

| Total volume of Fomblin ® M PFPE | (%) of $N_2$ on top of the reactor | (%) of $CO_2$ on top of the reactor | Reduction of $CO_2$ in the gas mixture (Δ$CO_2$)(%) |
|---|---|---|---|
| 2.5 | 77.6 | 22.4 | 44 |
| 4.5 | 88.0 | 12.0 | 70 |

TABLE 4

| Total volume of Fomblin ® Y PFPE | (%) of $N_2$ on top of the reactor | (%) of $CO_2$ on top of the reactor | Reduction of $CO_2$ in the gas mixture (Δ$CO_2$)(%) |
|---|---|---|---|
| 2.5 | 76.5 | 23.5 | 41 |
| 4.5 | 87.0 | 13.0 | 52 |

3. Test 2

Test 2 was carried out in the same reactor as Test 1, following a similar procedure. The temperature was set at 25° C. and 40° C. and $CO_2$ (100% by pressure) was filled in the empty reactor until a pressure of 3 bars was reached. 4.5 liter Fomblin® PFPE oil (M or Z, or Fomblin® M03 PFPE+5% Fomblin® DA306 PFPE, typically used as anti-rust additive) was added to the reactor, thereby increasing gas pressure, due to the reduction of the free volume. Also in this case theoretical pressure (Theor max P) was calculated considering the gases as ideal gases at the temperature and pressure of the test. The mixing system was then switched on and Initial Pressure (Initial P) was measured. After 400 seconds, the system was considered to have reached equilibrium conditions and the Final Pressure (Final P) value was measured.

The results of the experiments are reported in table 5 below.

TABLE 5

Absorption of CO2 at different temperatures

| PFPE fluid | T ° C. | Theor max P (bars) | Initial P (bars) | Final P (bars) after 400 sec | ΔP theor-initial (%) | ΔP theor-final (%) |
|---|---|---|---|---|---|---|
| Fomblin® M PFPE | 25 | 18.52 | 5.05 | 3.77 | 73 | 80 |
| Fomblin® Y PFPE | 25 | 18.52 | 9.08 | 7.27 | 51 | 61 |
| Fomblin® M PFPE | 40 | 19.45 | 4.98 | 1.24 | 74 | 94 |
| Fomblin® M PFPE + Fomblin® DA306 PFPE | 40 | 19.45 | 5.02 | 1.4 | 74 | 93 |

The results show that linear Fomblin® M PFPE has a considerably higher ability to absorb $CO_2$ than branched Fomblin® Y PFPE. This higher ability is shown also when Fomblin® M PFPE is mixed with anti-rust additive Fomblin® DA306 PFPE; therefore, the method of the invention can be effectively carried out also when the use of additives is required.

The invention claimed is:

1. A method for removing carbon dioxide ($CO_2$) from a gas mixture containing $CO_2$ and at least one other gas, said method comprising contacting the gas mixture with at least one of:
  1) one or more linear (per)fluoropolyether PFPE fluid of formula (I):

T-O—$(CF_2O)_{a1}(CF_2CF_2O)_{a2}(CF_2CF_2CF_2O)_{a3}$ $(CF_2CF_2CF_2CF_2O)_{a4}$-T'     (I)

wherein:
    T and T', equal to or different from each other, are selected from $CF_3$, $C_2F_5$ and $C_3F_7$;
    a1, a2, a3 and a4, equal to or different from each other, are independently integers ≥0, selected in such a way that a1+a2+a3+a4 ranges from 20 to 220 and a2/a1 ranges from 0.1 to 10; and wherein, when at least two of a1-a4 are different from 0, recurring units of ($CF_2O$), ($CF_2CF_2O$), ($CF_2CF_2CF_2O$), and ($CF_2CF_2CF_2CF_2O$), when present, are statistically distributed along the chain;
  2) one or more linear PFPE fluid of formula (II):

T-O—$(CF_2CF_2C(Hal)_2O)_{b1}$—$(CF_2CF_2CH_2O)_{b2}$— $(CF_2CF_2CH(Hal)O)_{b3}$-T'     (II)

wherein
    T and T', equal to or different from each other, are selected from —$CF_3$, —$C_2F_5$ or —$C_3F_7$;
    Hal, equal or different at each occurrence, is a halogen selected from F and Cl;
    b1, b2, and b3 equal or different from each other, are independently integers ≥0, such that b1+b2+b3 is in the range 5 to 250; and wherein, when at least two of b1, b2, and b3 are different from zero, recurring units of ($CF_2CF_2C(Hal)_2O$), ($CF_2CF_2CH_2O$) and ($CF_2CF_2CH(Hal)O$), when present, are statistically distributed along the chain.

2. The method according to claim 1 wherein the linear PFPE fluid complies with formula (I).

3. The method according to claim 2 wherein the PFPE fluid of formula (I) has an average molecular weight ranging from 2,000 to 12,500 and a kinematic viscosity ASTM D445 at 20° C. ranging from 10 to 1,300 cSt.

4. The method according to claim 3 wherein the PFPE fluid of formula (I) has a molecular weight of 4,000 and a kinematic viscosity ASTM D445 at 20° C. of 30 cSt.

5. The method according to claim 1 wherein the one or more linear PFPE of formula (I) and/or (II) is used in admixture with one of more branched PFPE fluids selected from formulae (III)-(VI):

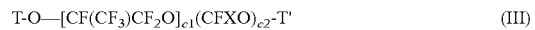

T-O—$[CF(CF_3)CF_2O]_{c1}(CFXO)_{c2}$-T'     (III)

wherein:
  X is equal to —F or —$CF_3$;
  T and T', equal to or different from each other, are selected from —$CF_3$, —$C_2F_5$ and —$C_3F_7$;
  c1 and c2, equal or different from each other, are independently integers ≥0 selected such that the c1/c2 ratio is between 20 and 1,000 and c1+c2 is in the range 5 to 250; and wherein, when c1 and c2 are both different from 0, recurring units of [CF($CF_3$)$CF_2O$] and (CFXO) are statistically distributed along the chain;

$C_3F_7O$—$[CF(CF_3)CF_2O]_d$-T"     (IV)

wherein
  T" is equal to —$C_2F_5$ or —$C_3F_7$;
  d is an integer from 5 to 250;

{$C_3F_7O$—$[CF(CF_3)CF_2O]_e$—$CF(CF_3)$—}$_2$     (V)

wherein
  e is an integer between 2 and 250;

T-O—$[CF(CF_3)CF_2O]_{f1}(C_2F_4O)_{f2}(CFX)_{f3}$-T'     (VI)

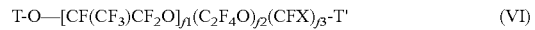

wherein
  X is equal to —F or —$CF_3$;
  T and T', equal to or different from each other, are selected from —$CF_3$, —$C_2F_5$ and —$C_3F_7$;
  f1, f2 and f3 equal or different from each other, are independently integers ≥0, such that f1+f2+f3 is in the range 5 to 250; and wherein, when at least two of f1, f2 and f3 are different from zero, recurring units of [CF($CF_3$)$CF_2O$], ($C_2F_4O$) and (CFX), when present, are statistically distributed along the chain;
said one or more branched PFPE fluid being in an amount ranging from 1 to 50% by weight with respect to the one or more PFPE fluid of formula (I) and/or (II).

6. The method according to claim 5 wherein the branched PFPE fluid complies with formula (III).

7. The method according to claim 1 wherein the at least one other gas is selected from hydrogen, nitrogen, oxygen, carbon monoxide, nitrogen oxides, sulphur oxides, methane and low molecular weight hydrocarbons.

8. The method according to claim 1 wherein the gas mixture is a gas stream given off in a combustion process of fossils in a power plant.

9. The method according to claim 1 wherein the one or more PFPE fluid (I) and/or (II) and, optionally, the one or more PFPE fluid (III) to (VI) is mixed with 1 to 10% by weight of one or more additives.

10. The method according to claim 1 wherein a2/a1 ranges from 0.5 to 2.

11. The method according to claim 1 wherein Hal is F.

12. A method for removing carbon dioxide ($CO_2$) from a gas mixture containing $CO_2$ and at least one other gas, said method comprising contacting the gas mixture with:
   one or more linear (per)fluoropolyether PFPE fluid of formula (I):

$$T-O-(CF_2O)_{a1}(CF_2CF_2O)_{a2}(CF_2CF_2CF_2O)_{a3}(CF_2CF_2CF_2CF_2O)_{a4}-T' \quad (I)$$

wherein:
   T and T', equal to or different from each other, are selected from $CF_3$, $C_2F_5$ and $C_3F_7$;
   a1, a2, a3 and a4, equal to or different from each other, are independently integers $\geq 0$, selected in such a way that a1+a2+a3+a4 ranges from 20 to 220 and a2/a1 ranges from 0.1 to 10; and wherein, when at least two of a1-a4 are different from 0, recurring units of ($CF_2O$), ($CF_2CF_2O$), ($CF_2CF_2CF_2O$), and ($CF_2CF_2CF_2CF_2O$), when present, are statistically distributed along the chain;
   in admixture with one of more branched PFPE fluid of formula (III):

$$T-O-[CF(CF_3)CF_2O]_{c1}(CFXO)_{c2}-T' \quad (III)$$

wherein:
   X is equal to —F or —$CF_3$;
   T and T', equal to or different from each other, are selected from $CF_3$, $C_2F_5$ and $C_3F_7$;
   c1 and c2, equal or different from each other, are independently integers $\geq 0$ selected such that the c1/c2 ratio is between 20 and 1,000 and c1+c2 is in the range 5 to 250; and wherein, when c1 and c2 are both different from zero, recurring units of [$CF(CF_3)CF_2O$] and ($CFXO$) are statistically distributed along the chain;
   said one or more branched PFPE fluid of formula (III) being in an amount ranging from 1 to 50% by weight with respect to the one or more PFPE fluid of formula (I).

13. The method according to claim 12 wherein the PFPE fluid of formula (I) has an average molecular weight ranging from 2,000 to 12,500 and a kinematic viscosity ASTM D445 at 20° C. ranging from 10 to 1,300 cSt.

* * * * *